(12) United States Patent
McGowan (10) Patent No.: US 9,137,051 B2
(45) Date of Patent: Sep. 15, 2015

(54) METHOD AND APPARATUS FOR REDUCING RENDERING LATENCY FOR AUDIO STREAMING APPLICATIONS USING INTERNET PROTOCOL COMMUNICATIONS NETWORKS

(75) Inventor: James W. McGowan, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1279 days.

(21) Appl. No.: 12/971,698

(22) Filed: Dec. 17, 2010

(65) Prior Publication Data

US 2012/0158408 A1    Jun. 21, 2012

(51) Int. Cl.
*G10L 19/00* (2013.01)
*H04L 12/66* (2006.01)
*G10L 19/005* (2013.01)
*G10L 19/16* (2013.01)

(52) U.S. Cl.
CPC .............. *H04L 12/66* (2013.01); *G10L 19/005* (2013.01); *G10L 19/167* (2013.01)

(58) Field of Classification Search
CPC . G10L 19/005; G10L 19/167; H04L 43/0829; H04L 43/0852; H04L 43/087; H04L 47/32; H04L 12/66
USPC .......................................................... 704/500
See application file for complete search history.

(56) References Cited

U.S. PATENT DOCUMENTS

| 6,584,104 | B1 | 6/2003 | McGowan |
| 6,731,634 | B1 | 5/2004 | McGowan |
| 6,931,017 | B2 | 8/2005 | McGowan |
| 7,099,820 | B1* | 8/2006 | Huart et al. ................... 704/207 |
| 7,411,985 | B2 | 8/2008 | Lee et al. |
| 7,783,482 | B2 | 8/2010 | Janiszewski et al. |
| 2003/0091160 | A1* | 5/2003 | Enbom et al. ................ 379/67.1 |
| 2004/0122680 | A1 | 6/2004 | McGowan et al. |
| 2006/0187970 | A1 | 8/2006 | Lee et al. |
| 2008/0046249 | A1* | 2/2008 | Thyssen et al. .............. 704/262 |
| 2010/0284281 | A1* | 11/2010 | Sperschneider ............. 370/242 |
| 2010/0324911 | A1* | 12/2010 | Jougit et al. ................. 704/500 |

OTHER PUBLICATIONS

T.M. Levergood, et al., "AudioFile: A Network—Transparent System for Distributed Audio Applications", available online at: http://www.hpl.hp.com/techreports/Compaq-DEC/CRL-93-8.pdf, Digital Equipment Corporation 1993, Cambridge Research Lab, CRL 93/8, Jun. 11, 1993, 110 pages.

* cited by examiner

*Primary Examiner* — Angela A Armstrong
(74) *Attorney, Agent, or Firm* — C. Bilicska; K. M. Brown (57) ABSTRACT

A method and apparatus for reducing rendering latency in a terminal device which receives audio data from a communication network such as, for example, Voice over Internet Protocol (VoIP) communications networks. Received packets are advantageously decoded "immediately" upon receipt, and the decoded data is placed directly in the rendering buffer at a location corresponding to the time appropriate for rendering, without using any intermediate buffer. Then, in accordance with the principles of the present invention and more particularly in accordance with certain illustrative embodiments thereof, packet loss concealment (PLC) routines are advantageously applied preemptively, without first determining whether or not any subsequent packets have or have not been received by any particular time.

11 Claims, 4 Drawing Sheets

METHOD AND APPARATUS FOR REDUCING RENDERING LATENCY FOR AUDIO STREAMING APPLICATIONS USING INTERNET PROTOCOL COMMUNICATIONS NETWORKS

FIELD OF THE INVENTION

The present invention relates generally to the field of audio streaming applications using Internet Protocol communications networks such as Voice over Internet Protocol (VoIP) speech communications networks, and more particularly to a method and apparatus for reducing rendering latency in a terminal device which receives audio (e.g. speech) data from such networks.

BACKGROUND OF THE INVENTION

In general purpose operating systems, low latency media streaming is difficult to achieve, despite some recent progress. What is critical is not the average latency, but the latency for some high percentage (>>99%) of the material to be rendered. An underlying issue is that streaming media applications, as typically implemented currently, require multiple, separately clocked processes.

Consider Voice over Internet Protocol (VoIP) speech communication. Typically, a soundcard running on its own clock consumes sound samples from a rendering buffer. Separately, the soundcard clock or, alternatively, an Operating System (OS) clock, triggers a jitter management routine at a fixed periodic rate, n. (Typically, n=20 msec.) This routine consumes data from a jitter buffer, and results in sound samples being placed in the rendering buffer. The rendering buffer therefore needs to be a swapped double-buffer, to ensure that the soundcard isn't locked out of reading samples when the jitter manager is placing those samples in, and vice-versa. Separately, a network interface controller (NIC) receives an incoming speech packet at some unknown time. This arrival triggers a copy of the packet from the NIC into the previously mentioned receive buffer. Alternatively, in the cases of some operating systems, a NIC buffer is instead copied by a separate process into the jitter buffer. The OS may or may not perform a real copy, and the buffers may or may not introduce double-buffer latency. (Typically, there is actually another clock in the NIC listening to the physical layer on the wire, and decoding material into an internal NIC buffer. We can ignore this clock and buffer because it introduces little latency and is unavoidable.)

Calling a jitter management routine frequently is problematic because of the inherent tension in the technique. One wishes to minimize latency, so for that reason, the buffer management routine should be called as late as possible, to allow for all last-moment packet arrivals. However, one wishes to maximize the smoothness of playback, so for that reason, the buffer management routine should be called as early as possible. If the buffer management routine is called too early, material that has arrived on time for rendering will be considered late. If the buffer management routine is called too late, every glitch in the clocking of routines will result in audible artifacts. Unfortunately, the OS scheduler is responsible for reacting within this narrow time slice. What is needed is a novel method for avoiding the last-moment callback needed to give a packet as much of a chance to arrive "in time" while also minimizing the overall latency.

SUMMARY OF THE INVENTION

The instant inventor has recognized that a novel alternative approach can advantageously minimize rendering latency without incurring the typical disadvantages thereof. In particular, and in accordance with certain illustrative embodiments of the present invention, received packets are advantageously decoded "immediately" upon receipt, and the decoded data is placed directly in the rendering buffer at a location corresponding to the time appropriate for rendering. Then, in accordance with the principles of the present invention and more particularly in accordance with certain illustrative embodiments thereof, packet loss concealment (PLC) routines (which are fully familiar to those of ordinary skill in the art) are advantageously applied preemptively, without first determining whether or not any subsequent packets have or have not been received by any particular time, and the generated PLC data is also placed directly in the rendering buffer (at a location corresponding to the time appropriate for rendering).

For example, in accordance with one illustrative embodiment of the present invention, the receipt of a 20 msec frame (e.g., a packet comprising 20 msec of speech data) is advantageously decoded, and, for example, 5 (additional) subsequent concealment packets are generated, thereby generating a total of 120 msec worth of speech data. Then, in accordance with the illustrative embodiment of the present invention, the entire resulting 120 msec worth of generated data is placed directly in the rendering buffer (at the appropriate locations therefor).

In addition, in accordance with one illustrative embodiment of the present invention, the state of the decoder is advantageously saved prior to the generation of each concealment packet, so that subsequently arriving packets can be properly decoded and rendered as if the corresponding concealment packet(s) had not been generated, by restoring the decoder state to the proper corresponding saved state thereof. Meanwhile, however, packets that do in fact fail to arrive in time for rendering already have previously generated PLC replacement data advantageously available, without the need for any additional callbacks and clocks.

DETAILED DESCRIPTION OF THE PREFERRED EMBODIMENTS

Figure 1:
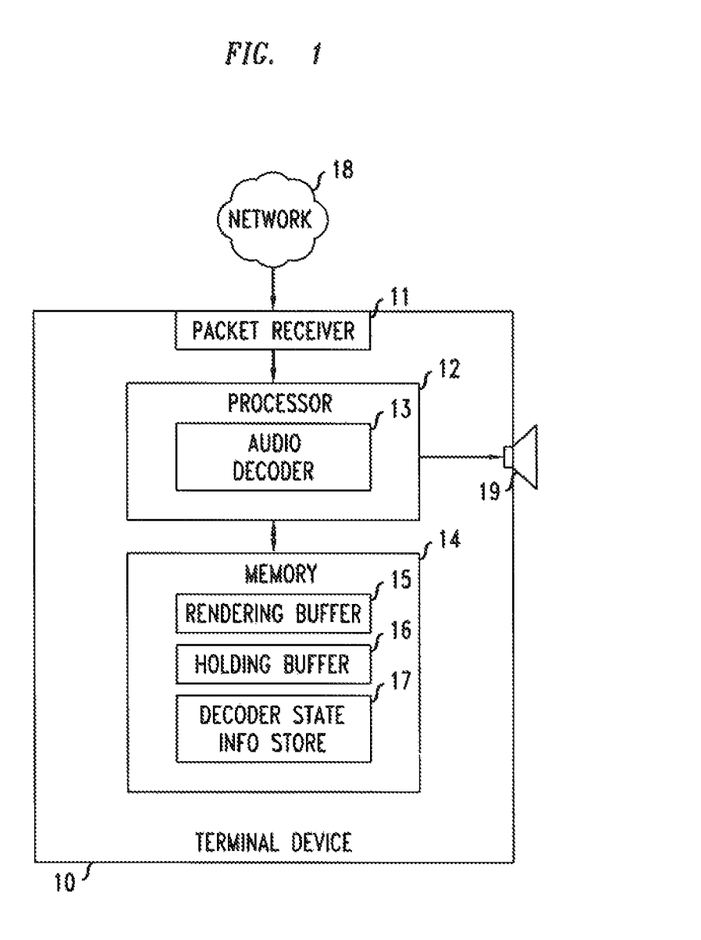
FIG. 1 shows a block diagram of an illustrative terminal device for receiving audio data communicated thereto across an Internet Protocol (IP) communications network in accordance with an illustrative embodiment of the present invention.

FIG. 1 shows a block diagram of an illustrative terminal device for receiving audio data communicated thereto across an Internet Protocol (IP) communications network in accordance with an illustrative embodiment of the present invention. The illustrative terminal device of FIG. 1 (terminal device 10) comprises packet receiver 11 which receives encoded audio signal packets from the communications network (network 18) representative of audio (e.g., speech) that is to be rendered by the terminal device; processor 12 which, inter cilia, comprises (e.g., has implemented therein) audio decoder 13 for use in decoding said encoded audio signal packets and for generating packet loss concealment (PLC) data; memory 14 which, inter alia, includes rendering buffer 15, "holding" buffer 16 (see discussion of FIG. 3 below), and decoder state storage 17, each implemented therein; and output 19 (e.g., a speaker) for rendering audio from terminal device 10. (In certain illustrative embodiments of the present invention, audio decoder 13 may be advantageously implemented as program code stored in memory 14 and executed by processor 12.)

In operation of the illustrative terminal device of FIG. 1, terminal device 10 receives and decodes encoded audio signal packets to thereby generate decoded audio data (which is stored in the rendering buffer); stores decoder state information in the memory; generates packet loss concealment (PLC) data (which is also stored in the rendering buffer); restores decoder state information from the memory when appropriate; and renders the audio data stored in the rendering buffer as output from the terminal device. The packet loss concealment (PLC) data may be generated with use of any of a number of conventional PLC techniques which will be fully familiar to those of ordinary skill in the art.

Figure 2:
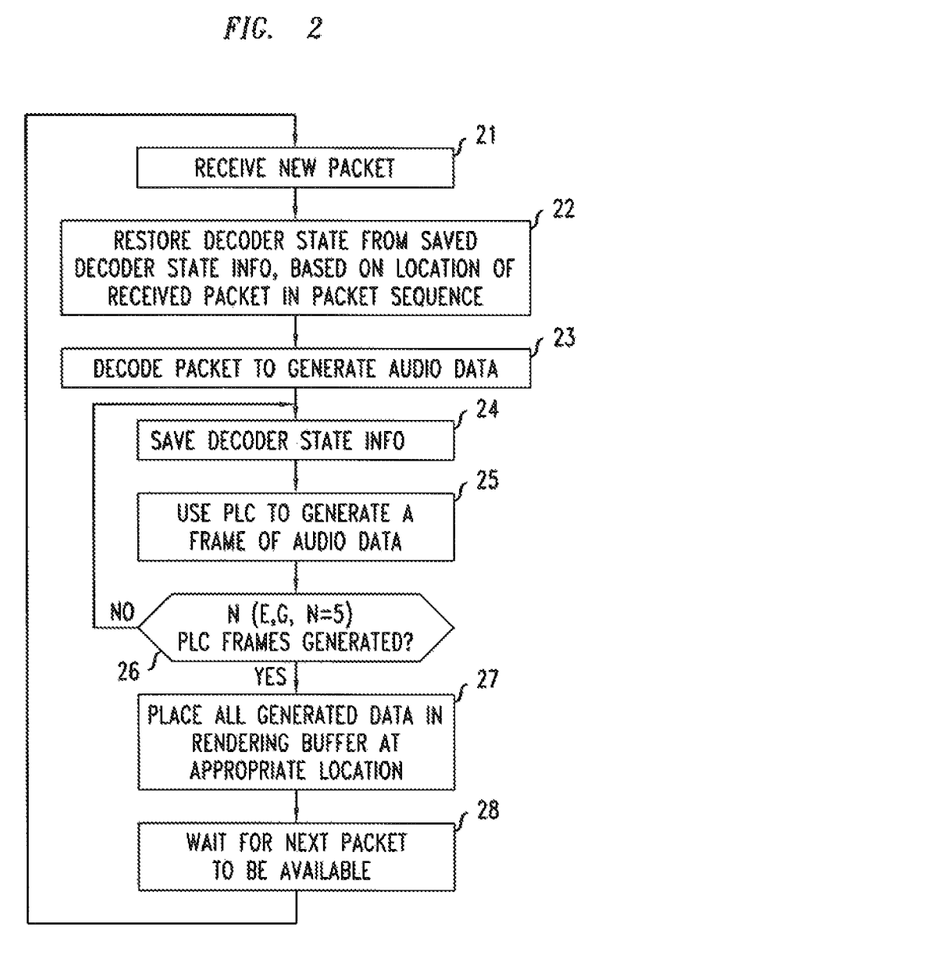
FIG. 2 shows a flow chart of a first illustrative method for receiving audio data communicated across au Internet Protocol (IP) communications network in accordance with an illustrative embodiment of the present invention.

FIG. 2 shows a flow chart of a first illustrative method for receiving audio data communicated across an Internet Protocol (IP) communications network in accordance with an illustrative embodiment of the present invention. As described above, in the illustrative method of FIG. 2, received packets are advantageously decoded "immediately" upon receipt, and the decoded data is placed directly in the rendering buffer at a location corresponding to the time appropriate for rendering. In addition, packet loss concealment (PLC) routines are advantageously applied preemptively, without first determining whether or not any subsequent packets have or have not been received by any particular time, and the generated PLC data is also placed directly in the rendering buffer (also at a location corresponding to the time appropriate for rendering). Moreover, in accordance with the illustrative method of FIG. 2, the state of the decoder is advantageously saved prior to the generation of each concealment packet, so that subsequently arriving packets can be properly decoded and rendered as if the corresponding concealment packet(s) had not been generated, by merely restoring the decoder state to the proper corresponding saved state thereof.

Specifically, the illustrative method of FIG. 2 operates as follows. As shown in block 21 of the illustrative flowchart, a new audio packet is received, wherein the audio packet has a particular, specified location (e.g., a relative time) within an overall sequence of packets. Based on the sequence location, as shown in block 22, the state of the decoder is restored from (previously) saved decoder state information corresponding to the sequence location of the received packet. (Note that block 22 can be omitted for the very first packet of a sequence—that is, the first audio packet of a given audio stream.) Then, as shown in block 23, the received packet is decoded by the decoder to generate a frame of audio data.

Next, as shown in block 24, the decoder state information is saved for possible future use (in block 22 of the flowchart), and then, as shown in block 25, a packet loss concealment (PLC) frame of data is preemptively (i.e., without waiting to determine whether or not the next packet in the sequence has or has not been received within any given time interval) generated and added to (the end of) the data generated so far for the given received packet. Decision block 26 then checks to see if a given (illustratively; fixed and predetermined) number, N (illustratively, N=5) of PLC frames have been generated, and if not, returns to block 24 to save the decoder state information and to generate another PLC frame of data.

If, on the other hand, all N frames of PLC data have been generated, then, as shown in block 27, all of the resulting generated audio data (i.e., the data generated from the decoding of the received audio packet followed by the N frames of PLC data which have been preemptively generated) is placed in the rendering buffer, starting at the location therein which corresponds to the sequence location of the received packet. Finally, as shown in block 28, the illustrative method of FIG. 2 waits for the next packet to be received, and returns to block 21 when it has been. The illustrative process then repeats for this next received packet.

Note that in the case where packets are received out of order, the illustrative method of FIG. 2 does not perform with as much accuracy as is possible, since the earlier received packet (whose location would be later in the sequence of packets) is not re-decoded after the later received packet (whose location would be earlier in the sequence of packets). In other words, the illustrative method of FIG. 2, does not force a re-decoding of the earlier received packet even though the decoding of the later received packet would provide for a higher quality decoding of the earlier received packet. Advantageously, the illustrative method of FIG. 3 rectifies this.

Figure 3:
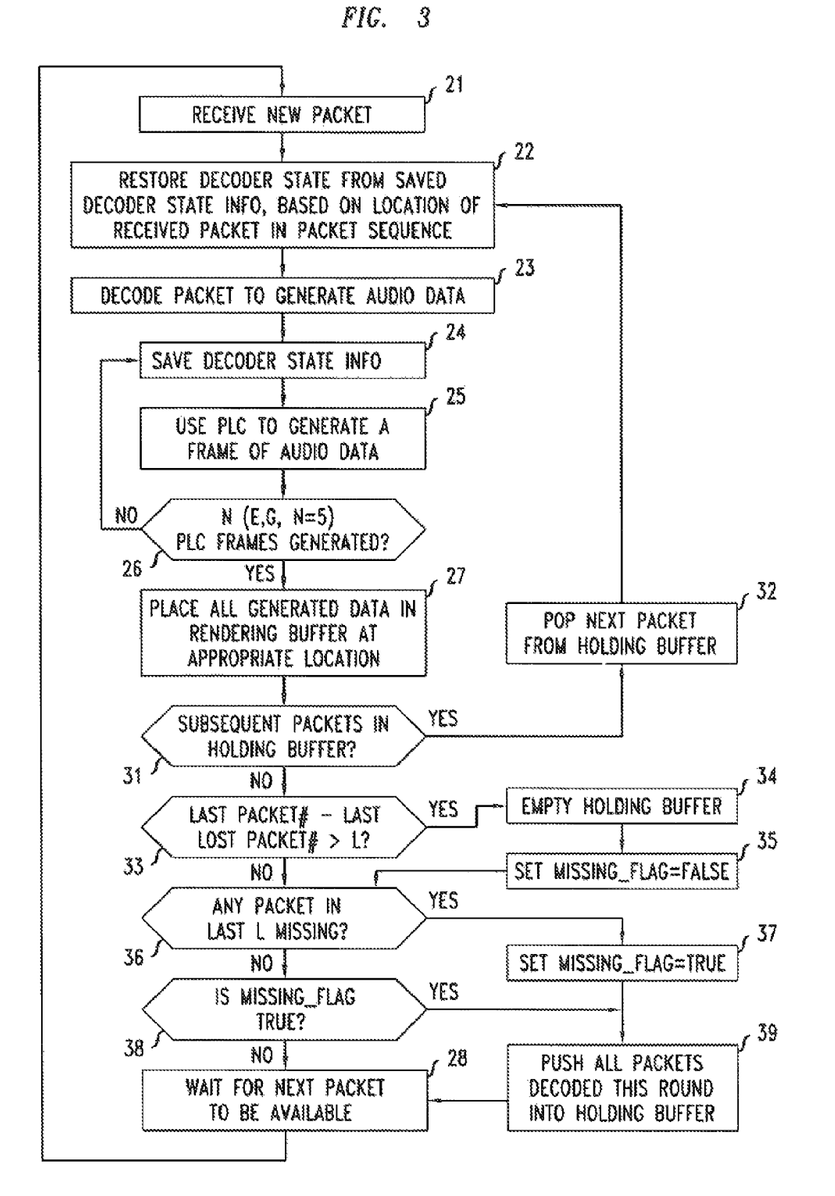
FIG. 3 shows a flow chart of a second illustrative method for receiving audio data communicated across an Internet Protocol (IP) communications network in accordance with an illustrative embodiment of the present invention.

In particular, FIG. 3 shows a flow chart of a second illustrative method for receiving audio data communicated across an Internet Protocol (IP) communications network in accordance with an illustrative embodiment of the present invention. In this illustrative embodiment of the invention, packets that are received out of order (i.e., when an "earlier" packet is received after a "later" one) are processed with more accuracy than in, for example, the illustrative method shown in FIG. 2.

More particularly, in order to advantageously handle packets that are received out of order, the illustrative method of FIG. 3 advantageously maintains a "holding buffer" (in addition to the rendering buffer). This holding buffer advantageously holds all received packets which have been processed but for which one or more prior packets have not yet been received, even though these packets being held in the holding buffer have already been decoded and stored in the rendering buffer. In this manner, if and when one or more of those prior, previously not received packets is in fact received, this "late" packet may be advantageously processed (i.e., decoded, after restoring the appropriate decoder state, and then stored in the rendering buffer), and then, any subsequent packet(s) thereto which have been stored in the holding buffer may be advantageously re-processed (i.e., decoded, after restoring the appropriate decoder state, and then stored in the rendering buffer) in turn. It will be obvious to those of ordinary skill in the art that this technique advantageously results in a more accurate decoding of the subsequent packet(s), since the re-processing of these packets will be based on more accurate previous data than was the earlier processing thereof.

Specifically, the illustrative method of FIG. 3 operates as follows. [Note that much, but not all, of the illustrative flowchart of FIG. 3 is identical to the illustrative flowchart of FIG. 2. Specifically, the operations of blocks 21 through 27 are identical in the two illustrative methods, but their description is included in the discussion of the illustrative method of FIG. 3 herein for completeness.]

As shown in block 21 of the illustrative flowchart, a new audio packet is received, wherein the audio packet has a particular, specified location (e.g., a relative time) within an overall sequence of packets. Based on the sequence location, as shown in block 22, the state of the decoder is restored from (previously) saved decoder state information corresponding to the sequence location of the received packet. (Note that block 22 can be omitted for the very first packet of a sequence—that is, the first audio packet of a given audio stream.) Then, as shown in block 23, the received packet is decoded by the decoder to generate a frame of audio data.

Next, as shown in block 24, the decoder state information is saved for possible future use (in block 22 of the flowchart), and then, as shown in block 25, a packet loss concealment (PLC) frame of data is preemptively (i.e., without waiting to determine whether or not: the next packet in the sequence has or has not been received within any given time interval) generated and added to (the end of) the data generated so far for the given received packet. Decision block 26 then checks to see if a given (illustratively, fixed and predetermined) number, N (illustratively, N=5) of PLC frames have been generated, and if not, returns to block 24 to save the decoder state information and to generate another PLC frame of data.

If, on the other hand, all N frames of PLC data have been generated, then, as shown in block 27, all of the resulting generated audio data (i.e., the data generated from the decoding of the received audio packet followed by the N frames of PLC data which have been preemptively generated) is placed in the rendering buffer, starting at the location therein which corresponds to the sequence location of the received packet. At this point, the operation of the illustrative method of FIG. 3 begins to deviate from that of the illustrative method of FIG. 2.

Specifically, after the generated audio data is placed in the rendering buffer as shown in block 27, the illustrative method of FIG. 3 checks (in decision block 31) whether there are any packets in the holding buffer (see above for discussion of the holding buffer) which are subsequent (in time) in the sequence of audio packets to the received packet that was just processed. If so, the next such packet (in time) is popped from the holding buffer in block 32, and flow returns to block 22 to process (actually, to re-process) that particular audio packet (as if it were a newly "received packet"). If there are no subsequent packets in the holding buffer (as determined by decision block 31), then the sequence location of the packet just processed is compared to the last "lost" (i.e., never received and thus missing) packet's sequence location. If the last lost packet was more than a predetermined number (L, which may, for example, be illustratively equal to 5) of packets earlier than the packet just processed, then it is advantageous to "give up" on the possibility that any of these missing packets will be later received. In such a case, as shown in blocks 34 and 35, respectively, the holding buffer is emptied and a flag (MISSING_FLAG) is set to False.

Next, decision block 3G determines whether there are any missing packets in the set of L packets prior to the packet just processed. If so, MISSING_FLAG is set to True in block 37. If not, decision block 38 checks to see if MISSING_FLAG is True, and if so (or if MISSING_FLAG was set to true in block 37), all of the packets that were decoded in this cycle ("round") through the flowchart are pushed into the holding buffer for possible future re-processing. Finally, as shown in block 28, the illustrative method of FIG. 3 waits for the next packet to be received, and returns to block 21 when it has been. The illustrative process then repeats for this next received packet.

Figure 4:
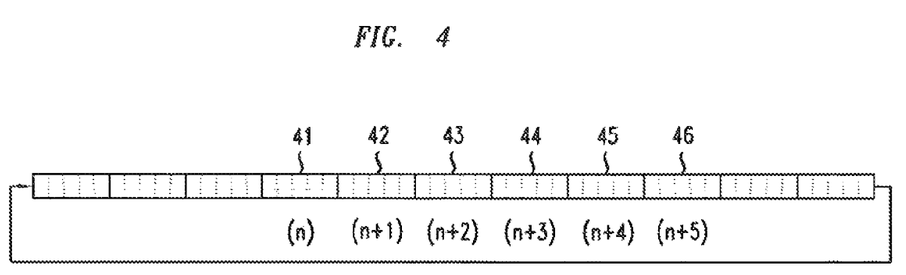
FIG. 4 shows a diagram of an illustrative rendering buffer for use in the illustrative terminal device for receiving audio data communicated thereto across an Internet Protocol (IP) communications network as shown in FIG. 1.

FIG. 4 shows a diagram of an illustrative rendering buffer for use in the illustrative terminal device for receiving audio data communicated thereto across an Internet Protocol (IP) communications network shown in FIG. 1. As shown in the figure, the illustrative rendering buffer operates as a circular buffer (wherein the end of the buffer is conceptually connected to the beginning of the buffer), and comprises audio data representative of a sequence of fixed time-length audio "frames" (e.g., those having a time duration of, say, 20 msec). [Note that for ease of understanding, the audio frames are shown as comprising only a small number of audio data samples each.]

Specifically, the figure shows audio data frame 41 generated from a decoding of encoded audio signal packet "n", and following that in the illustrative rendering buffer, packet loss concealment audio data frames 42, 43, 44, 45 and 46, each comprising audio data generated with use of a packet loss concealment (PLC) technique applied by the decoder following the decoding of packet "n" (i.e., 5 successively generated PLC frames). Note that, in accordance with certain illustrative embodiments of the present invention, the decoder state is saved prior to the generation of each of said packet loss concealment audio data frames. In this manner, with reference to FIG. 4, if and when one of encoded audio signal packet "n+1" through "n+5" is received (and hasn't already been rendered from the terminal device, the corresponding decoder state can be restored and the received encoded audio signal packet may be advantageously decoded and stored in the corresponding location in the rendering buffer. (That is, if encoded audio signal packet "n+1" is received, the decoded audio data is advantageously stored in the rendering buffer at the location of audio data frame 42, if encoded audio signal packet "n+2" is received, the decoded audio data is advantageously stored in the rendering buffer at the location of audio data frame 43, etc.)

ADDENDUM TO THE DETAILED DESCRIPTION

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in a tangible, non-transitory computer readable medium and so executed by a computer or processor, whether or not such computer or processor is explicitly shown.

A person of ordinary skill in the art would readily recognize that steps of various above-described methods can be performed by programmed computers. Herein, some embodiments are also intended to cover tangible, non-transitory program storage devices, e.g., digital data storage media, which are machine or computer readable and encode machine-executable or computer-executable programs of instructions, wherein said instructions perform some or all of the steps of said above-described methods. The program storage devices may be, e.g. digital memories, magnetic storage media such as magnetic disks and magnetic tapes, hard drives, or optically readable digital data storage media, but are limited to include only tangible, non-transitory storage devices. The embodiments are also intended to cover computers programmed to perform said steps of the above-described methods.

The functions of any elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method performed by a terminal device for receiving audio data communicated thereto across an Internet Protocol (IP) communications network, the terminal device comprising a packet receiver, a processor and a memory, the memory including a rendering buffer implemented therein, the method comprising:

receiving an encoded audio signal packet using the packet receiver, the encoded audio signal packet being comprised in a sequence of encoded audio signal packets, the sequence of encoded audio signal packets comprising data representative of an audio signal;

in response to receiving said encoded audio signal packet, using a decoder implemented on the processor to decode the received encoded audio signal packet to generate corresponding decoded audio data and storing said corresponding decoded audio data in the rendering buffer;

in further response to receiving said encoded audio signal packet, and without making any determination that one or more encoded audio signal packets in said sequence of encoded audio signal packets subsequent to said encoded audio signal packet have not been received, using the decoder to perform packet loss concealment, thereby generating one or more concealment packets of audio data representative of audio data subsequent to said decoded audio data, and further storing said one or more generated concealment packets of audio data in said rendering buffer;

rendering said decoded audio data stored in said rendering buffer and said one or more generated concealment packets of audio data stored in said rendering buffer as audio output from said terminal device;

saving in said memory a corresponding state of the decoder prior to said generation of each of said concealment packets of audio data;

receiving a previous encoded audio signal packet using the packet receiver, said previous encoded audio signal packet being received after the receipt of the encoded audio signal packet, the previous encoded audio signal packet being comprised in the sequence of encoded audio signal packets prior to said encoded audio signal packet and being representative of audio data for which one of said concealment packets of audio data has been generated and stored in said rendering buffer;

restoring said saved state of said decoder corresponding to said generation of said concealment packet of audio data representative of said audio data represented by said previous encoded audio signal packet;

in response to receiving said previous encoded audio signal packet, using the decoder implemented on the processor to decode the received previous encoded audio signal packet to generate corresponding decoded audio data and storing said corresponding decoded audio data in the rendering buffer so as to replace said concealment packet of audio data representative of said audio data represented by said previous encoded audio signal packet which had been previously stored in said rendering buffer; and retrieving said received encoded audio signal packet from said holding buffer and using the decoder implemented on the processor to re-decode the received encoded audio signal packet to generate corresponding decoded audio data and storing said corresponding decoded audio data in the rendering buffer;

wherein the memory further comprises a holding buffer, the method further comprising storing said received encoded audio signal packet in said holding buffer.

2. The method of claim 1 wherein audio data comprises speech and wherein the Internet Protocol communications network comprises a Voice over Internet Protocol (VoIP) communications network.

3. The method of claim 1 further comprising:

receiving a subsequent encoded audio signal packet using the packet receiver, said subsequent encoded audio signal packet being received after the receipt of the encoded audio signal packet, the subsequent encoded audio signal packet being comprised in the sequence of encoded audio signal packets subsequent to said encoded audio signal packet and being representative of audio data for which one of said concealment packets of audio data has been generated and stored in said rendering buffer;

restoring said saved state of said decoder corresponding to said generation of said concealment packet of audio data representative of said audio data represented by said subsequent encoded audio signal packet; and in response to receiving said subsequent encoded audio signal packet, using the decoder implemented on the processor to decode the received subsequent encoded audio signal packet to generate corresponding decoded audio data and storing said corresponding decoded audio data in the rendering buffer so as to replace said concealment packet of audio data representative of said audio data represented by said subsequent encoded audio signal packet which had been previously stored in said rendering buffer.

4. The method of claim 3 further comprising, in further response to receiving said subsequent encoded audio signal packet, and without making any determination that one or more encoded audio signal packets in said sequence of encoded audio signal packets subsequent to said subsequent encoded audio signal packet have not been received, using the decoder to perform packet loss concealment to generate one or more concealment packets of audio data representative of audio data subsequent to said decoded audio data corresponding to said subsequent encoded audio signal packet, and further storing said one or more generated concealment packets of audio data in said rendering buffer.

5. A communications network terminal device for receiving audio data communicated thereto across an Internet Protocol (IP) communications network, the terminal device comprising:
 a packet receiver which receives an encoded audio signal packet, the encoded audio signal packet being comprised in a sequence of encoded audio signal packets, the sequence of encoded audio signal packets comprising data representative of an audio signal;
 a processor having a decoder implemented thereon; and
 a memory, the memory including a rendering buffer implemented therein,
 wherein in response to the packet receiver receiving said encoded audio signal packet, the decoder implemented on the processor decodes the received encoded audio signal packet to generate corresponding decoded audio data and stores said corresponding decoded audio data in the rendering buffer, wherein
 in further response to the packet receiver receiving said encoded audio signal packet, and without making any determination that one or more encoded audio signal packets in said sequence of encoded audio signal packets subsequent to said encoded audio signal packet have not been received, the decoder implemented on the processor performs packet loss concealment, thereby generating one or more concealment packets of audio data representative of audio data subsequent to said decoded audio data, and further stores said one or more generated concealment packets of audio data in said rendering buffer, and wherein
 said decoded audio data stored in said rendering buffer and said one or more generated concealment packets of audio data stored in said rendering buffer are rendered as audio output from said terminal device; and wherein
 the packet receiver further receives a previous encoded audio signal packet, said previous encoded audio signal packet being received after the receipt of the encoded audio signal packet, the previous encoded audio signal packet being comprised in the sequence of encoded audio signal packets prior to said encoded audio signal packet and being representative of audio data for which one of said concealment packets of audio data has been generated and stored in said rendering buffer, and wherein
 the processor further restores said saved state of said decoder corresponding to said generation of said concealment packet of audio data representative of said audio data represented by said previous encoded audio signal packet, and wherein
 in response to receiving said previous encoded audio signal packet, the processor uses the decoder implemented thereon to decode the received previous encoded audio signal packet to generate corresponding decoded audio data and store said corresponding decoded audio data in the rendering buffer so as to replace said concealment packet of audio data representative of said audio data represented by said previous encoded audio signal packet which had been previously stored in said rendering buffer, and wherein
 the processor further retrieves said received encoded audio signal packet from said holding buffer and uses the decoder implemented thereon to re-decode the received encoded audio signal packet to generate corresponding decoded audio data and store said corresponding decoded audio data in the rendering buffer;
 wherein said processor further saves in said memory a corresponding state of the decoder prior to said generation of each of said concealment packets of audio data; and
 wherein the memory further comprises a holding buffer, and wherein said processor further stores said received encoded audio signal packet in said holding buffer.

6. The terminal device of claim 5 wherein said audio data comprises speech and wherein the Internet Protocol communications network comprises a Voice over Internet Protocol (VoIP) communications network.

7. The terminal device of claim 5 wherein the packet receiver further receives a subsequent encoded audio signal packet, said subsequent encoded audio signal packet being received after the receipt of the encoded audio signal packet, the subsequent encoded audio signal packet being comprised in the sequence of encoded audio signal packets subsequent to said encoded audio signal packet and being representative of audio data for which one of said concealment packets of audio data has been generated and stored in said rendering buffer, wherein
 the processor further restores said saved state of said decoder corresponding to said generation of said concealment packet of audio data representative of said audio data represented by said subsequent encoded audio signal packet, and wherein
 in response to receiving said subsequent encoded audio signal packet, the decoder implemented on the processor further decodes the received subsequent encoded audio signal packet to generate corresponding decoded audio data and stores said corresponding decoded audio data in the rendering buffer so as to replace said concealment packet of audio data representative of said audio data represented by said subsequent encoded audio signal packet which had been previously stored in said rendering buffer.

8. The terminal device of claim 7 wherein, in further response to receiving said subsequent encoded audio signal packet, and without making any determination that one or more encoded audio signal packets in said sequence of encoded audio signal packets subsequent to said subsequent encoded audio signal packet have not been received, the decoder implemented on the processor further performs packet loss concealment to generate one or more concealment packets of audio data representative of audio data subsequent to said decoded audio data corresponding to said subsequent encoded audio signal packet, and further stores said one or more generated concealment packets of audio data in said rendering buffer.

9. A non-transitory tangible computer readable medium product comprising non-transitory data recorded thereupon, the data recorded thereupon comprising program instructions which when executed by a computer system implement a method performed by a terminal device for receiving audio data communicated thereto across an Internet Protocol (IP) communications network, the terminal device comprising a packet receiver, a processor and a memory, the memory including a rendering buffer implemented therein, the method comprising program instructions for:

receiving an encoded audio signal packet using the packet receiver, the encoded audio signal packet being comprised in a sequence of encoded audio signal packets, the sequence of encoded audio signal packets comprising data representative of an audio signal;

in response to receiving said encoded audio signal packet, using a decoder implemented on the processor to decode the received encoded audio signal packet to generate corresponding decoded audio data and storing said corresponding decoded audio data in the rendering buffer;

in further response to receiving said encoded audio signal packet, and without making any determination that one or more encoded audio signal packets in said sequence of encoded audio signal packets subsequent to said encoded audio signal packet have not been received, using the decoder to perform packet loss concealment, thereby generating one or more concealment packets of audio data representative of audio data subsequent to said decoded audio data, and further storing said one or more generated concealment packets of audio data in said rendering buffer;

rendering said decoded audio data stored in said rendering buffer and said one or more generated concealment packets of audio data stored in said rendering buffer as audio output from said terminal device;

saving in said memory a corresponding state of the decoder prior to said generation of each of said concealment packets of audio data;

receiving a previous encoded audio signal packet using the packet receiver, said previous encoded audio signal packet being received after the receipt of the encoded audio signal packet, the previous encoded audio signal packet being comprised in the sequence of encoded audio signal packets prior to said encoded audio signal packet and being representative of audio data for which one of said concealment packets of audio data has been generated and stored in said rendering buffer;

restoring said saved state of said decoder corresponding to said generation of said concealment packet of audio data representative of said audio data represented by said previous encoded audio signal packet;

in response to receiving said previous encoded audio signal packet, using the decoder implemented on the processor to decode the received previous encoded audio signal packet to generate corresponding decoded audio data and storing said corresponding decoded audio data in the rendering buffer so as to replace said concealment packet of audio data representative of said audio data represented by said previous encoded audio signal packet which had been previously stored in said rendering buffer; and retrieving said received encoded audio signal packet from said holding buffer and using the decoder implemented on the processor to re-decode the received encoded audio signal packet to generate corresponding decoded audio data and storing said corresponding decoded audio data in the rendering buffer;

wherein the memory further comprises a holding buffer, the computer readable medium product further comprising program instructions recorded thereupon for storing said received encoded audio signal packet in said holding buffer.

10. The computer readable medium product of claim 9 further comprising program instructions recorded thereupon for:

receiving a subsequent encoded audio signal packet using the packet receiver, said subsequent encoded audio signal packet being received after the receipt of the encoded audio signal packet, the subsequent encoded audio signal packet being comprised in the sequence of encoded audio signal packets subsequent to said encoded audio signal packet and being representative of audio data for which one of said concealment packets of audio data has been generated and stored in said rendering buffer;

restoring said saved state of said decoder corresponding to said generation of said concealment packet of audio data representative of said audio data represented by said subsequent encoded audio signal packet; and in response to receiving said subsequent encoded audio signal packet, using the decoder implemented on the processor to decode the received subsequent encoded audio signal packet to generate corresponding decoded audio data and storing said corresponding decoded audio data in the rendering buffer so as to replace said concealment packet of audio data representative of said audio data represented by said subsequent encoded audio signal packet which had been previously stored in said rendering buffer.

11. The computer readable medium product of claim 10 further comprising program instructions recorded thereupon which, in further response to receiving said subsequent encoded audio signal packet, and without making any determination that one or more encoded audio signal packets in said sequence of encoded audio signal packets subsequent to said subsequent encoded audio signal packet have not been received, using the decoder to perform packet loss concealment to generate one or more concealment packets of audio data representative of audio data subsequent to said decoded audio data corresponding to said subsequent encoded audio signal packet, and further storing said one or more generated concealment packets of audio data in said rendering buffer.

* * * * *